Mar. 13, 1923.

S. VARGA.
ORNAMENTAL FLYTRAP.
FILED NOV. 23, 1922.

1,448,098.

Inventor
S. Varga

By F. J. Bryant
Attorney

Patented Mar. 13, 1923.

1,448,098

UNITED STATES PATENT OFFICE.

STEVEN VARGA, OF SAN FRANCISCO, CALIFORNIA.

ORNAMENTAL FLYTRAP.

Application filed November 23, 1922. Serial No. 602,860.

*To all whom it may concern:*

Be it known that I, STEVEN VARGA, a citizen of Yugoslavia, residing at San Francisco, in the county of San Francisco and State of California, have invented certain new and useful Improvements in Ornamental Flytraps, of which the following is a specification.

This invention relates to certain new and useful improvements in ornamental fly traps wherein the trap in the form of a vase having an enlarged bowl portion at the lower end thereof constituting the catcher or trap portion has the upper neck end closed by a cup-shaped stopper designed for supporting flowers or the like.

A further object of the invention is to provide a fly trap of the type above set forth wherein a conically-shaped baffle plug is mounted within the neck portion of the trap for directing the filling of the liquid contents outwardly of the entrance opening at the bottom of the device for the flies.

With the above and other objects in view as the nature of the invention is better understood the same consists of the novel form, combination and arrangement of parts hereinafter more fully described, shown in the accompanying drawing and claimed.

Figure 1:
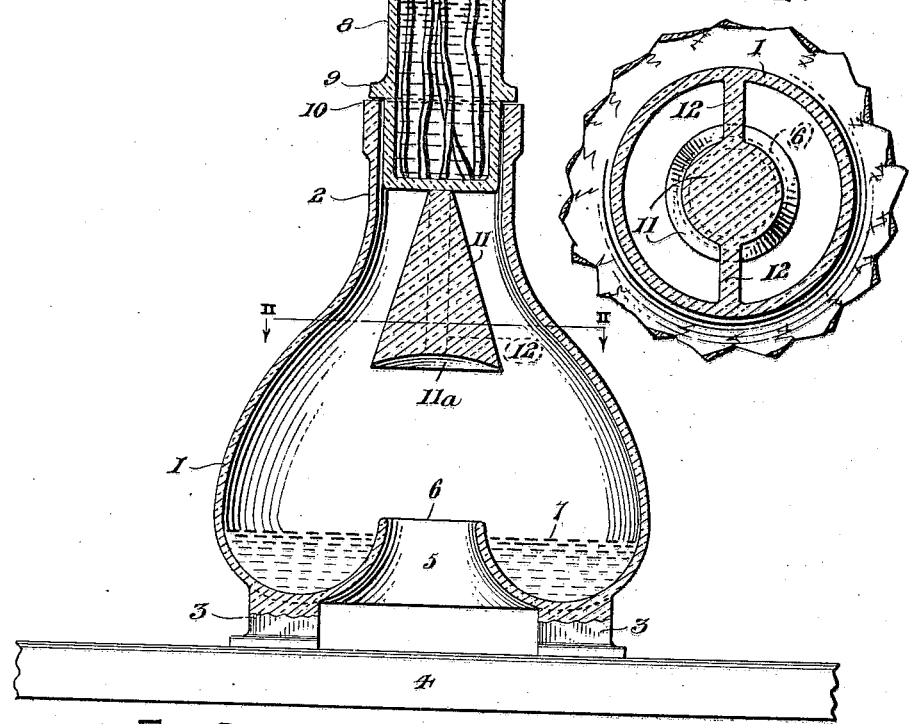

In the drawing, wherein like reference characters designate corresponding parts throughout the several views, Figure 1 is a vertical sectional view of an ornamental fly trap constructed in accordance with the present invention, showing the trap constructed in simulation of a vase with the cup-shaped closure stopper for the upper end thereof and a conical liquid baffle plug in the neck of the trap.

Figure 2:
Figure 3:
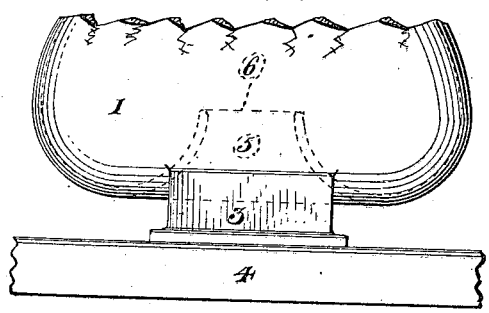

Figure 2 is a horizontal sectional view taken on line II—II of Fig. 1 showing the lower peripheral edge of the conical baffle plug positioned outwardly of and concentric with the edge wall of the fly entrance opening in the bottom wall of the trap receptacle, and Figure 3 is a fragmentary side elevational view showing one of the supporting feet.

Referring more in detail to the accompanying drawing, there is illustrated an ornamental fly trap, preferably constructed of transparent material, such as glass, in the form of a vase having a lower bowl portion 1 and an upper neck portion 2, the bottom wall of the bowl-shaped end 1 carrying integrally formed block feet 3 for mounting upon a support 4. The bottom wall of the receptacle has an upwardly directed cone-shaped portion 5 formed centrally thereof that is open at its upper end at 6 to form an entrance to the receptacle for flies, a solution such as water or vinegar and indicated by the reference numeral 7 being placed in the receptacle at a level beneath the upper edge of the opening 6 as illustrated in Fig. 1.

A closure cup 8 having an annular flange 9 is mounted in the open end of the neck portion 2 of the receptacle to provide a closure therefor, the flange 9 resting upon the ledge 10 at the upper end of the neck as shown in Fig. 1, the cup-shaped closure 8 being designed for containing cut flowers for purposes of ornamenting the device.

To facilitate the pouring of liquid into the receptacle through the neck portion 2, and to eliminate the passage thereof through the fly entrance opening 6, a conically-shaped plug 11 is disposed within the neck portion 2 at a point below the upper edge 10 thereof and is supported by diametrically opposite ribs 12, preferably formed integral with the plug 11 and walls of the receptacle as shown in Fig. 2. The liquid poured into the receptacle through the neck portion 2 will be deflected by the conically-shaped baffle plug 11 to flow into the bowl-shaped lower end 1 to be directed outwardly of the entrance opening 6, the bottom wall of the conical plug 11 being concaved as at 11ª to prevent the liquid from traveling upon the bottom face of the conical plug and thereby eliminating any possibility of the liquid escaping through the fly entrance opening 6 as will at once be obvious from an inspection of Fig. 1.

From the above detail description of the device, it is believed that the construction and operation thereof will at once be apparent, it being noted that the cup-shaped closure 8 having the flange 9 resting upon the upper edge of the receptacle neck 2, is further supported at its lower end upon the upper end of the conical-shaped block 11 and the adjacent ends of the ribs 12, and while there is herein shown and described the preferred embodiment of the present invention, it is nevertheless to be understood that minor changes may be made therein without departing from the spirit and scope thereof as claimed.

What is claimed as new is:—

1. In an ornamental fly trap, a vase-like receptacle having a fly entrance opening in the bottom wall thereof, a cup-shaped closure for the upper end of the receptacle, and means within the receptacle for directing the liquid poured therein laterally of the fly entrance opening in the bottom wall.

2. In an ornamental fly trap, a vase-like receptacle having a fly entrance opening in the bottom wall thereof, a cup-shaped closure for the upper end of the receptacle, and a conically-shaped plug mounted in the receptacle adjacent the neck portion thereof for outwardly deflecting liquid poured in the receptacle laterally of the fly entrance opening in the bottom wall thereof.

3. In an ornamental fly trap, a vase-like receptacle having a fly entrance opening in the bottom wall thereof, a cup-shaped closure for the upper end of the receptacle, a conically-shaped plug mounted in the receptacle adjacent the neck portion thereof for outwardly deflecting liquid poured in the receptacle laterally of the fly entrance opening in the bottom wall thereof, and rib members for supporting the conical plug formed integral with the plug and the adjacent side walls of the receptacle.

4. In an ornamental fly trap, a vase-like receptacle having a fly entrance opening in the bottom wall thereof, a cup-shaped closure for the upper end of the receptacle, a conically-shaped plug mounted in the receptacle adjacent the neck portion thereof for outwardly deflecting liquid poured in the receptacle laterally of the fly entrance opening in the bottom wall thereof, and rib members for supporting the conical plug formed integral with the plug and the adjacent side walls of the receptacle, the upper end of the conical plug and the upper ends of the ribs being horizontally alined and spaced below the upper edge of the neck portion of the receptacle constituting a support for the cup-shaped closure.

In testimony whereof I affix my signature.

STEVEN VARGA.

Witnesses:
G. A. BURNETT,
JESSIE E. HANSEN.